US009244527B2

(12) United States Patent
Lathrop et al.

(10) Patent No.: US 9,244,527 B2
(45) Date of Patent: Jan. 26, 2016

(54) SYSTEM, COMPONENTS AND METHODOLOGIES FOR GAZE DEPENDENT GESTURE INPUT CONTROL

(71) Applicants: VOLKSWAGEN AG, Wolfsburg (DE); AUDI AG, Ingolstadt (DE)

(72) Inventors: William Brian Lathrop, San Jose, CA (US); Maria Esther Mejia Gonzalez, Braunschweig (DE); Bryan Grant, Palo Alto (CA); Heiko Maiwand, Foster City, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 13/850,668

(22) Filed: Mar. 26, 2013

(65) Prior Publication Data

US 2014/0292665 A1    Oct. 2, 2014

(51) Int. Cl.
*G09G 5/00*   (2006.01)
*G06F 3/01*   (2006.01)
*G06F 3/041*  (2006.01)

(52) U.S. Cl.
CPC .............. *G06F 3/013* (2013.01); *G06F 3/0416* (2013.01); *G06F 2203/0381* (2013.01)

(58) Field of Classification Search
CPC ......... G06F 3/011; G06F 3/013; G06F 3/005; G06F 3/017; G06F 1/163; G06F 17/30705; G06F 2203/011; G06F 21/6263; G06F 3/041; G06F 3/012; G06F 11/1402; G06F 17/241; G06F 17/30268; G06F 17/30861; G06F 1/1632

USPC ........................................................ 345/7–9
See application file for complete search history.

(56) References Cited

U.S. PATENT DOCUMENTS

| 5,757,268 | A  | * | 5/1998  | Toffolo et al. ............... 340/461 |
| 7,438,414 | B2 |   | 10/2008 | Rosenberg |
| 8,560,976 | B1 | * | 10/2013 | Kim .............................. 715/863 |
| 2002/0041260 | A1 | * | 4/2002 | Grassmann ..................... 345/7 |
| 2011/0063425 | A1 |   | 3/2011 | Tieman |
| 2011/0082627 | A1 | * | 4/2011 | Small et al. ..................... 701/48 |
| 2012/0169582 | A1 | * | 7/2012 | Tschirhart .................... 345/156 |
| 2012/0272179 | A1 | * | 10/2012 | Stafford ....................... 715/781 |

FOREIGN PATENT DOCUMENTS

| DE | 19852873 A1 | 5/2000 |
| DE | 10338647 A1 | 3/2005 |
| DE | 102007025531 A1 | 12/2008 |

* cited by examiner

*Primary Examiner* — Duc Dinh
(74) *Attorney, Agent, or Firm* — Barnes & Thornburg LLP

(57) ABSTRACT

A control system, components and methodologies enable control of vehicle and in-vehicle system functionality via gesture recognition. In illustrative embodiments, the control system, constituent components and methodologies determine what functionality a user wishes to control by tracking the user's gaze to identify a selected function or function set. In combination with identifying the selected function and function set, one or more sensors installed in the vehicle detect one or more user gestures initiated by a user to interact with and/or control the selected function/function set.

26 Claims, 18 Drawing Sheets

Gesture on a Surface

Gesture in Space

FIGURE 1(A) Gesture on a Surface
FIGURE 1(B) Gesture in Space
FIGURE 1(C) Gesture on Knee

SYSTEM, COMPONENTS AND METHODOLOGIES FOR GAZE DEPENDENT GESTURE INPUT CONTROL

BACKGROUND

The present disclosure relates to a system, components and methodologies for enabling control of vehicle and in-vehicle infotainment system functionality via sensing a user's gaze direction and at least one user gesture. In particular, the present disclosure is directed to a system, components and methodologies that enable such control for a driver/passenger in a vehicle to form an in-vehicle control system.

SUMMARY

According to the present disclosure, a control system enables control of vehicle and in-vehicle system functionality via gesture recognition.

In illustrative embodiments, the control system, constituent components and methodologies determine what functionality a user wishes to control by tracking the user's gaze to identify a selected function or function set. In combination with identifying the selected function and function set, one or more sensors installed in the vehicle detect one or more user gestures initiated by a user to interact with and/or control the selected function/function set.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
FIGS. 1A-1C illustrate various options for where a user can perform gestures that will be recognized by a control system designed in accordance with the disclosed embodiments to input control commands.

According to the present disclosure, an in-vehicle vehicle control system simplifies the process for inputting control instructions to the vehicle's various systems.

Conventional user interfaces in automotive vehicles today are becoming more and more complicated to use. This is due in part to the increasing number and types of electronic features (also referred to as "functionality") that automotive manufacturers are including in vehicles.

For example, there are Graphical User Interfaces (GUIs) and manual user interface controls for controlling a main or auxiliary infotainment systems, steering wheel buttons for interacting with the instrument display, hard keys, and rotary encoders for making climate control adjustments, toggle switches for windows and lights and a variety of levers to push and pull in order to position a user's seat.

Even within a single constituent system within a vehicle, e.g., music, the complexity of controls is increasing at a very rapid pace due to the desire to integrate more and more functions into a package to provide a feature-rich system. For example, within conventional infotainment systems, there are virtual buttons, sliders, cursors, toggle switches, dials and keyboards used for various types of interaction.

Managing this increase in functionality is further complicated because of the increased complexity of user interfaces. For example, various user interfaces enable users to control a corresponding user device with gesture interaction relative to a user touchpad, i.e., an interactive 2-D surface (e.g., zoom, pinch. and swipe); moreover, some gestures are recognized by systems that are performed in 3-D space.

More specifically, the Nintendo® Wii® system enables a user to utilize/manipulate a device that can be tracked in x, y, and z space, as well as yaw, pitch, and roll via accelerometers. These inputs enable a user to use the device as a virtual golf club, baseball bat, hockey stick, or other type of tool, instrument, or piece of equipment that one might use in different gaming genres.

Another example showing successful implementation of gesture interaction is found in the Microsoft® Kinect® system. This system too is used for purposes of tracking user input, however, rather than tracking a physical device the user's gestures themselves are tracked via optical sensors.

Various automotive suppliers and manufacturers have also demonstrated prototype gesture systems; these systems have used gestures to control lists, press buttons, pull out menus, actuate displays, and control interactive elements that are available to the driver while seated in an automobile cabin.

Thus, various conventional technologies have attempted to address the complexity of interaction problem within and outside the automotive space. For example, US Patent Publication 2011/0063425 discloses a system that uses a camera to monitor surfaces of vehicle controls within the vehicle's cabin. That monitoring generates data used by a signal processing system to determine the position of user's hand relative to the control surfaces, and a display in the instrument cluster. The display in the instrument cluster shows a representation of the hand relative to the different controls in the center stack area of the vehicle, assisting the driver in interacting with the various buttons, knobs, and switches. This, in theory, enables the driver to keep his/her eyes relatively close to the roadway, rather than looking down at the controls when interacting with various feature and applications within the vehicle's cabin.

Alternatively, U.S. Pat. No. 7,438,414 discloses a system that incorporates gaze tracking and speech recognition for the selection of and subsequent interaction with a variety of devices located within the vicinity of the user. Thus, the system operates such that, when a user looks at a particular electronic device, the system is set in a mode that affords receipt of a certain set of speech commands for that particular device; thus, the user can perform interactions with the device using speech commands once the particular device has been selected via gaze tracking.

German Patent DE 10/2007/025/531 similarly discloses a system that incorporates gaze tracking for purposes of understanding what the driver is looking at for subsequent information augmentation. For example, if the user looks at a graphical object on the infotainment system, then additional information about that object can be presented. If a point of interest outside the vehicle is the user's target of gaze, then information augmentation can be presented to the user as well.

Lastly, German Patent DE 198/52/873 discloses a system that makes contrast adjustments to a liquid crystal display as a function of a detected gaze direction of a user; likewise, German Patent DE 103/38/647 makes display intensity adjustments according to gaze direction.

Thus, there are various conventional uses for gaze tracking technology within and outside of a user's automotive vehicle. However, conventional use of gestures to interact with such conventional in-vehicle electronic systems has been clumsy and awkward at best, and could very likely be dangerous when attempted during actual driving. This is due in large part to the high percentage of misrecognitions and false alarms that are detected by such conventional gesture recognition systems and their constituent algorithms.

However, deficiencies also stem from the fact that the many types of gestures afforded during various interactions with infotainment or driver assistance systems are defined unclearly or are unrecognizable because there is no context to the gesture. For example, if a user is standing next to a golf ball playing a virtual golfing game on a video game console, one or more inferences regarding user intent may be made to aid in identifying a user's type of gesture. This is because there is an implied user goal of performing an action in order to drive the golf ball down a virtual golf course range.

However, user intent is less clear when the user is in a sitting position in the cabin of an automotive vehicle because that user has the opportunity to interact with a variety of different vehicle and in-vehicle functions/function sets, e.g., various electronic features of a vehicle and/or the vehicle infotainment system. For example, what kind of gesture clearly indicates that a user would like to tune the automobile's radio to the third preset station. Thus, disclosed embodiments may utilize gestures that include user movements that have an intuitive mapping between a graphical element (e.g., what is included in or displayed on the one or more user interfaces).

A viable technical solution to these deficiencies would be particularly significant because ease of use not only makes products attractive for the consumer to buy but improves safety issue as well. For example, if a driver is fumbling with vehicle infotainment or other controls, lost in menus, or performing a task with ten embedded actions, rather than three, it is more likely that the safe operation of the vehicle has been compromised.

Accordingly, disclosed embodiments provide a solution to the technical problem of effectively enabling gesture recognition technology to allow a user to control functions with in-vehicle infotainment and driver assistance systems within an automotive vehicle. More specifically, disclosed embodiments address the deficiencies of conventional automotive user interfaces failing to recognize user gestures for the purposes of controlling functions/function sets (associated with or corresponding to a selected and/or recognized active area of interest) of an automotive vehicle and/or a constituent in-vehicle system(s).

Further, disclosed embodiments improve upon user interfaces for controlling automotive vehicles and constituent in-vehicle systems by reducing the complexity of required user gesture interactions by simplifying the in-vehicle user interface for the systems and applications that users typically interact with while driving.

This may be performed in at least one embodiment by providing a technical solution that enables a user to indicate a selection of a particular feature/feature set via gaze tracking technology in combination with enabling user input of control instructions for the selected feature/feature set using gesture recognition technology. In this way, disclosed embodiments simplify the gesture interaction schemes expected of a user to enable control of a feature rich automotive and/or in-vehicle system by incorporating gaze tracking and gesture recognition technology.

Utility of the disclosed embodiments is best understood by considering an example, in which a system user interface tracks gaze direction as part of selection of a system feature/feature set in an automobile. In combination with this mechanism for receiving selection of a feature/feature set, gesture recognition technology implemented using one or more tactile sensors, optical sensors or the like is utilized to receive gesture control input(s) from the user. In this way, gaze tracking technology may be used to provide, for example, context information indicating the user's selected feature/feature set selection so as to simplify complexity of required gestures for controlling the selected feature/feature set.

Thus, for example, a user could control selection of a third preset radio station on an in-vehicle system by simply looking at a third preset station button or icon on an in-vehicle GUI included in an automotive vehicle's control system and/or infotainment system, and simultaneously or subsequently tapping his finger any where he chooses, e.g., on a vehicle surface, in space or on the user's knee (see FIGS. 1A-1C; respectively), a user can indicate selection of that station on the vehicle's radio. A gesture to be recognized, therefore, may be as simple as a tap of a finger. Because the gesture to be recognized can be simplified when it is separated from the input required to select the feature or feature set (in this example, the gaze directed to the third preset station button or icon), the rate at which the gesture can be reliably recognized is increased. This increased recognition rate is due to greatly constraining the search space of the pattern recognizer that is used for gesture recognition.

Figure 2:
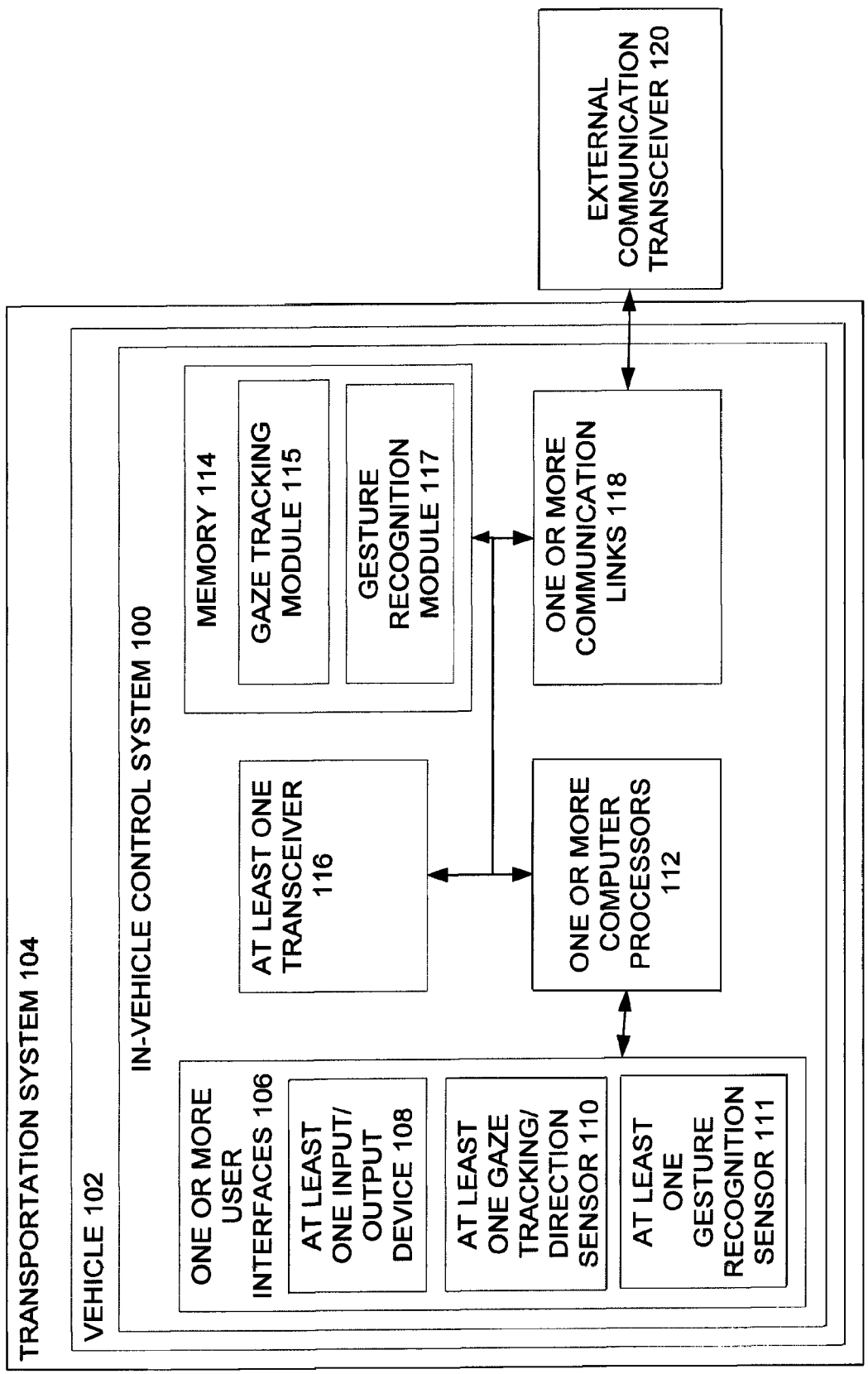
FIG. 2 illustrates an example of an in-vehicle control system that utilizes both gaze tracking and gesture recognition technology to receive input controls from a user.

Thus, as illustrated in FIG. 2, the disclosed embodiments provide an in-vehicle control system 100 that may utilize both gaze tracking and gesture recognition technology to receive input controls from a user. Such a system 100 may be included or installed in a vehicle 102 to provide a transportation system 104 with improved gesture recognition controlled technology.

Accordingly, as illustrated in FIG. 2, the system 100 may be comprised of one or more user interfaces 106 that may include at least one input/output device 108 and at least one gaze tracking/direction sensor 110. The at least one input/output device 108 may include, for example, a camera-based hand and finger gesture tracking sensor and/or tactile control surface (e.g., two-dimensional surface that includes sensors to detect user applied pressure to form glyphs or other instructions). The at least one gaze tracking/direction sensor 110 may be, for example, a camera-based eye tracking sensor.

It should be understood that, as explained herein, the at least one input/output device 108 may include optionally one or more control surface(s) that enable a user to trace gestures on the surface to indicate control commands.

Likewise, the system 100 may include one or more computer processors 112 along with memory 114 that includes one or more software and/or logic algorithms. For example, memory 114 may include a gaze tracking module 115 and a gesture recognition module 117. The gaze tracking module 115 includes software and utilizes hardware included in the system 100 to track a user's gaze direction and identify a selected function/function set by determining the user's gaze direction. Likewise, the gesture recognition module 117 includes software and utilizes hardware included in the system 100 to sense a user's gesture(s) and analyze the gesture(s) to determine one or more associated commands pertaining to the selected feature/feature set. As a result, these modules 115, 117 software instructions may be performed via the one or more computer processors 112 to provide the functionality described herein.

Furthermore, the system 100 may include at least one transceiver 116 and one or more other communication links that enable communication with one or more external communication transceivers 120. These transceivers 120 may be provided off of the vehicle 102 and provide information and data to the control system 100 including, for example, traffic information, broadcast analog, digital or satellite radio, etc.

As explained above, disclosed embodiments utilize eye or gaze tracking technology to enable a user to designate or specify an area of user interest. This information indicated by the user may be sensed using the at least one gaze tracking/direction sensor 110 and analyzed to determine the designated/specified are of user interest using software included in the gaze tracking module 115. As a result of this analysis, the gaze tracking module 115 is able to utilize the at least one gesture recognition sensor 111 to sense whether and what gesture is performed by the user to control the selected feature/feature set.

Additionally, the gesture recognition module 117 is able to generate and trigger output of feedback to the user, via, for example, the one or more user interfaces 106 (explained herein) about the currently recognized selection of the user's area of interest as a feedback loop.

Both the at least one gaze tracking/direction module 115 and the at least one gesture recognition module 117 include software that enables data processing for their corresponding sensors, 110, 111, respectively. Additionally, the gaze tracking/direction module 115 also includes software instructions for calculating raw gaze direction and accessing data included in memory 114 for determining a user's selection of a user area of interest and its associated feature/feature set, e.g., gaze-to-object mapping. Likewise, the gesture recognition module 117 also includes software instructions for accessing a raw gesture database stored in the memory 114 and performing calculation of raw gesture type analysis e.g., gesture interpretation and gesture-to-control mapping.

Additionally, use of eye or gaze tracking optionally enables the gesture recognition module 117 to optionally trigger output of one or more cues to a user (for example, via the one or more user interfaces 106) as to specific gesture(s) that can be performed within the currently recognized selected area of user interest. As a result, a characteristic(s) of output data on the one or more user interfaces 106 may serve as the cue as to what gesture(s) may be used to control the selected function/function set. For example, a list of options displayed in the selected area of interest may be used to cue the user to input a gesture conventionally recognized as a mechanism for scrolling up or down the list, e.g., by moving the finger up and down. Likewise, display of a map on the one or more user interfaces 106 may serve as a cue that the user can perform a, respectively.

This concept is quite similar to the standardization and inferences resulting from a standard Windows® GUI concept. For example, in a Microsoft® Word® document, various user interaction schemes are supported, e.g., a user selecting an entire document by placing a cursor in the center of the document and clicking on one of the buttons on a connected mouse. Doing so, selects the area of interest where the cursor was placed, e.g., if no particular object or text is at that location, the entire document is selected as a whole. Once that selection is made, the user scrolling the scroll wheel on the top of the mouse triggers scrolling through the entire document down. However, if a user uses the mouse to guide the cursor to the center of an upper tab menu and clicks on the mouse, the area of interest is the tool bar of the Microsoft® Word® program rather than the document. As a result, when a user scrolls the scroll wheel on the mouse, a different effect result, i.e., the tool bar translates side to side bringing different tab menu elements into focus.

In a similar way, the disclosed embodiments utilize gaze tracking to recognize a user's selected function/function set prior to receiving controls (via gesture recognition) for the selected function/function set. Accordingly, the same set, a similar set, an overlapping set or a subset of gestures may be used to trigger different control operations depending on the selected function/function set (which corresponds to the selected area of user interest).

Accordingly, disclosed embodiments enable determination of a user's area of interest by detecting where the user is looking.

Disclosed embodiments provide utility in improving ease of use for user's to operate vehicle and in-vehicle system functionality, which not only makes products attractive for a consumer to buy but improves safety issue as well. For example, if a driver is fumbling with vehicle infotainment or other controls, lost in menus, or performing a task with ten embedded actions, rather than three, it is more likely that the safe operation of the vehicle has been compromised. Moreover, at least one disclosed embodiment reduces or eliminates the need for a specific input device (for example, the need for a control surface) because gestures may be detected even when performed in free space or on a part of the vehicle. Thus, combining gaze tracking with gesture recognition simplifies the gesture interaction scheme because where one looks and what one wants to interact with affords a small set of possible and intuitive gesture commands. Accordingly, this interaction scheme can be applied to simple interactions (e.g., pressing one button on a graphical user interface among several buttons) and complex interactions alike (e.g., alphanumeric entry).

The camera-based eye tracking sensor(s) 110 may be used to track the gaze direction (vector) of a driver while seated in the driver's seat of the cabin (or likewise, a passenger if, for example, it is detected via camera monitoring that the passenger is interacting with an in-vehicle system such as an infotainment system). The sensor(s) 110 may be positioned, for example, directly in front of the driver, either in the instrument cluster area or integrated into the binnacle of the dashboard. Likewise, multiple sensors 110 may be utilized and the data they generate used to provide integrated data for the front of the cabin of the automotive vehicle (moreover, similar sensors could be used throughout the cabin to monitor additional passengers).

The camera-based hand and finger gesture tracking sensor(s) 111 may be used to track the position of the user's (e.g., driver and/or passenger) fingers and/or hands during interactions with the different interfaces in the vehicle 102. This may include interactions with display-based interfaces (e.g., infotainment display, instrument cluster, head-up, windshield, etc.) and interfaces without a display (e.g., rotary knobs, buttons, switches, levers, etc), as explained herein with reference to FIGS. 3-18.

The sensor(s) 111 may be positioned above the driver and/or passenger(s) at a location wherein the hand(s) of the user is not obscured (e.g., not behind the steering wheel or behind the user).

The data processing units (implemented via the gaze tracking module 115 and gesture recognition module 117 cooperating with and being utilized by the one or more computer processors 112) for both sensors 110, 111 (respectively) may be used to process and filter the received data. For example, data may be filtered or averaged across data points to provide a more accurate estimate of gaze direction, outlier data points can be removed from any subsequent calculations for gaze direction estimates, and the data can be corrected for any known systematic biases in gaze direction estimates. For example, as part of the operation of the gaze tracking module 115, after eye gaze data is generated, the direction of gaze can then be correlated with the direction of known interactive elements within the vehicle cabin. As a result, the direction of gaze could be correlated with the direction of the instrument cluster (showing perhaps a list of radio stations) or the direction of the infotainment system (showing perhaps a navigation map).

Likewise, as part of the operation of the gesture recognition module 117, after the gesture data is filtered, a type (e.g., up/down swipe) and magnitude (e.g., length of swipe) can be assigned to the gesture. Following assignment of type and magnitude to the gesture input, this data is then processed through a gesture interpretation algorithm. The gesture interpretation algorithm first receives input from the gaze correlation calculation.

As a result, the system is able to determine that the user is looking at, for example, the infotainment display, on which is shown a navigation map; or the system could have information that the user is looking at the instrument cluster display, on which is shown a list or radio stations.

Carrying this example further, suppose that it is determined the user is looking at the instrument cluster display showing a list of options, the software running on the control system 100 may control a corresponding feedback profile to a particular action, e.g., an up/down swipe will be assigned as a potential gesture to be recognized because the graphical element that make up the list move from the top of the display in a downward direction.

Alternatively, if the user is looking at the infotainment display displaying a navigation map, then the same up/down swipe gesture may be assigned a different feedback profile (e.g., the graphical elements that make up the navigation map will pan from the top of the display in a downward direction).

It should be understood that the mapping of the feedback profile (e.g., mapping of a gesture to a particular control effect based on a registered gaze direction and/or identified area of interest) can be preprogrammed or customized to a particular user (e.g., programmed through a customization phase for a particular user).

Figure 3:
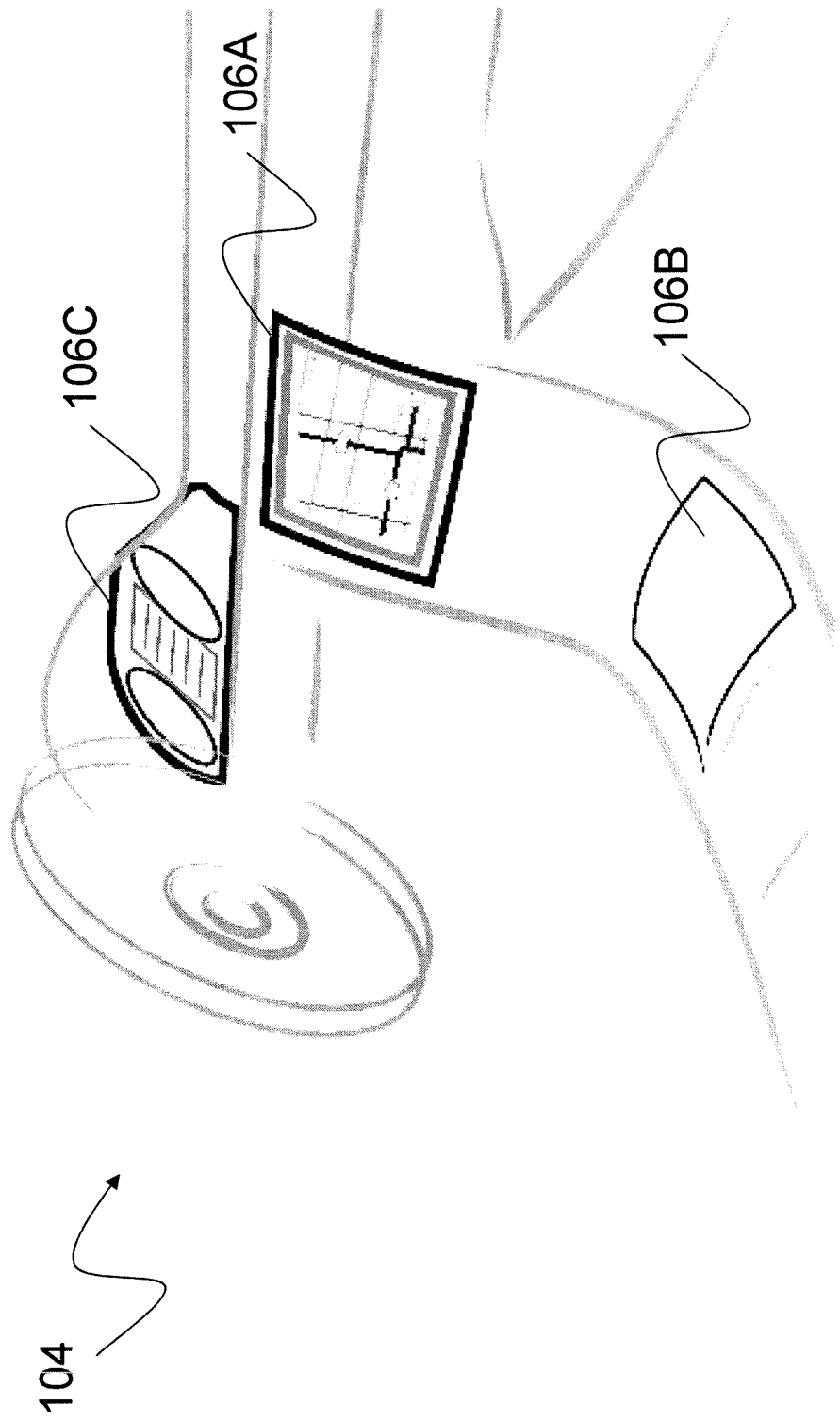
FIG. 3 illustrates examples of various user interfaces that may be incorporated in and/or utilized by the control system of the disclosed embodiments.

Once the feedback profile is programmed, it can be used for generating feedback and/or cues to a user via one or more of the user input/output interfaces 106. For example, as illustrated in FIG. 3, feedback could be provided in both a visual format on a vision-based display 106A, 106C and/or haptic feedback via a haptic interface 106B (e.g., vibration or some other tactile mechanism). Such a haptic interface may also include a touch screen as in interface 106A so as to be both visual and haptic in nature.

Haptics can be incorporated into the overall control system 100 (see FIG. 1) for haptic feedback. However, in at least one implementation, a touch screen/surface used according the disclosed embodiments need not necessarily have any circuitry for registering touch interactions; this is because a primary purpose of the gaze tracking and gesture recognition technology is to eliminate or reduce the need for a user to interact physically with a conventional touch screen and/or knobs, switches, etc.

Nevertheless, a touch screen/surface could, however, have circuitry for lighting, haptics, mechanical movements, surface shaping, etc. Such surfaces could simply be a clear piece of glass or even made out of unusual materials such as wood, ceramics, or fabrics.

Alternatively, because of the gaze tracking and gesture recognition technology utilized by the system, it should be understood that the user interface could conceptually be considered to be an open space. That is, one could perform a gesture in space, again with the gesture's meaning being a function of what the user is looking at while performing the gesture.

Moreover, a user could interact with a part of the vehicle or the user's own body in order to provide a user interface. This is possible because the user's gaze direction and gestures may be monitored by the modules 115, 117 to identify the user's area of interest and control input. For example, one could have their hand resting on their knee and then look over at the navigation map. Thus, if the user perform a "pinch" gesture with his fingers at this moment or shortly thereafter (in at least some embodiments, some period of time may be set for keeping a selected interest area active), then the system may alter the map that the user was looking at to change its scale (i.e., zoom in).

In accordance with one disclosed embodiment, a user may interact with the control system (e.g., system 102 illustrated in FIG. 2) via instrument cluster display 106C, infotainment display 106A, and/or touch surface 106B. Control inputs from a user are first determined by registering where the user is looking, e.g., looking at the infotainment display 106A with the intent to pan the map displayed thereon.

Figure 4:
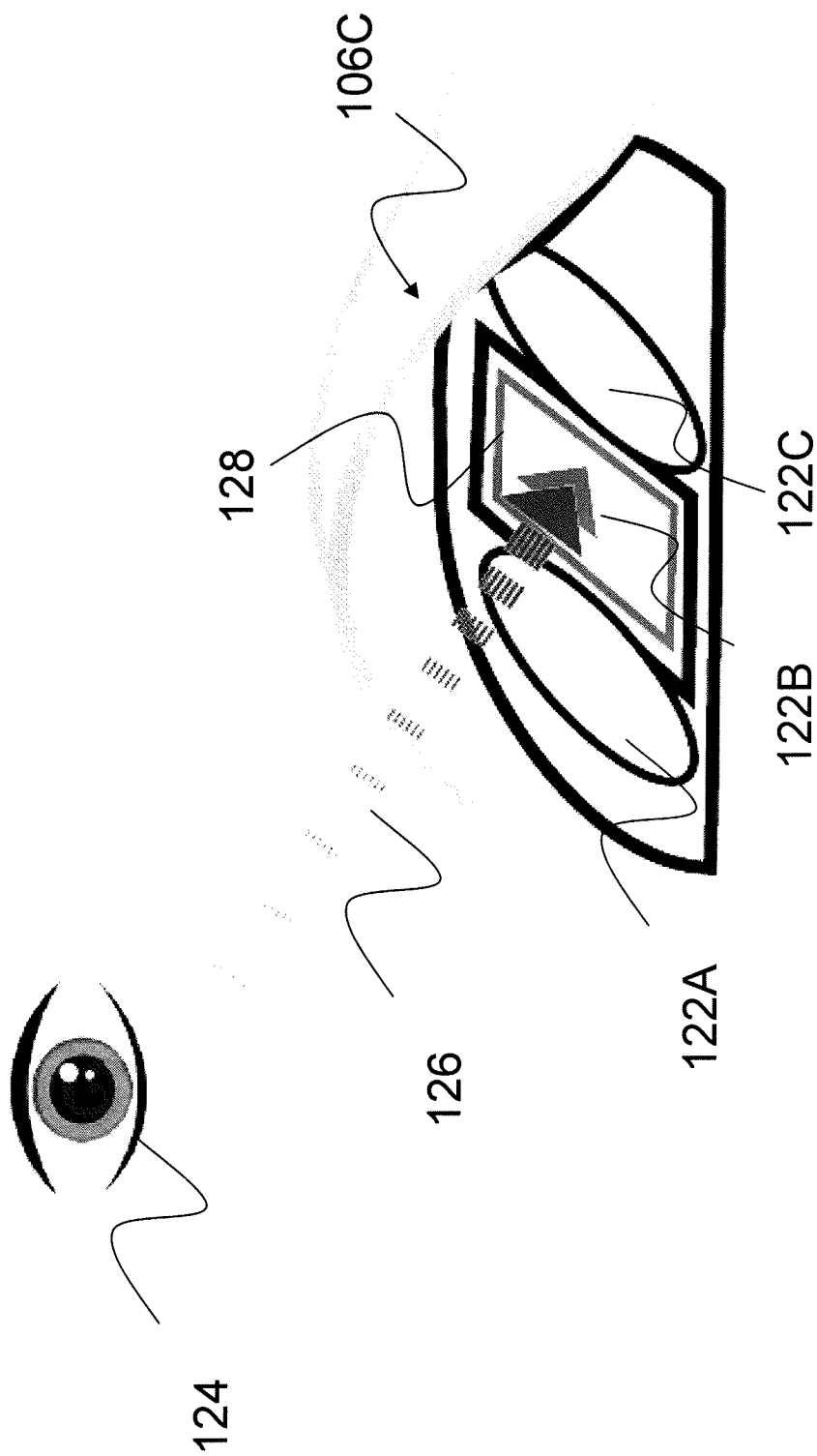
FIG. 4 is an illustrative embodiment indicating how a user's interaction with at least one user interface is analyzed using gaze tracking technology utilized by the control system of the disclosed embodiments.
Figure 5:
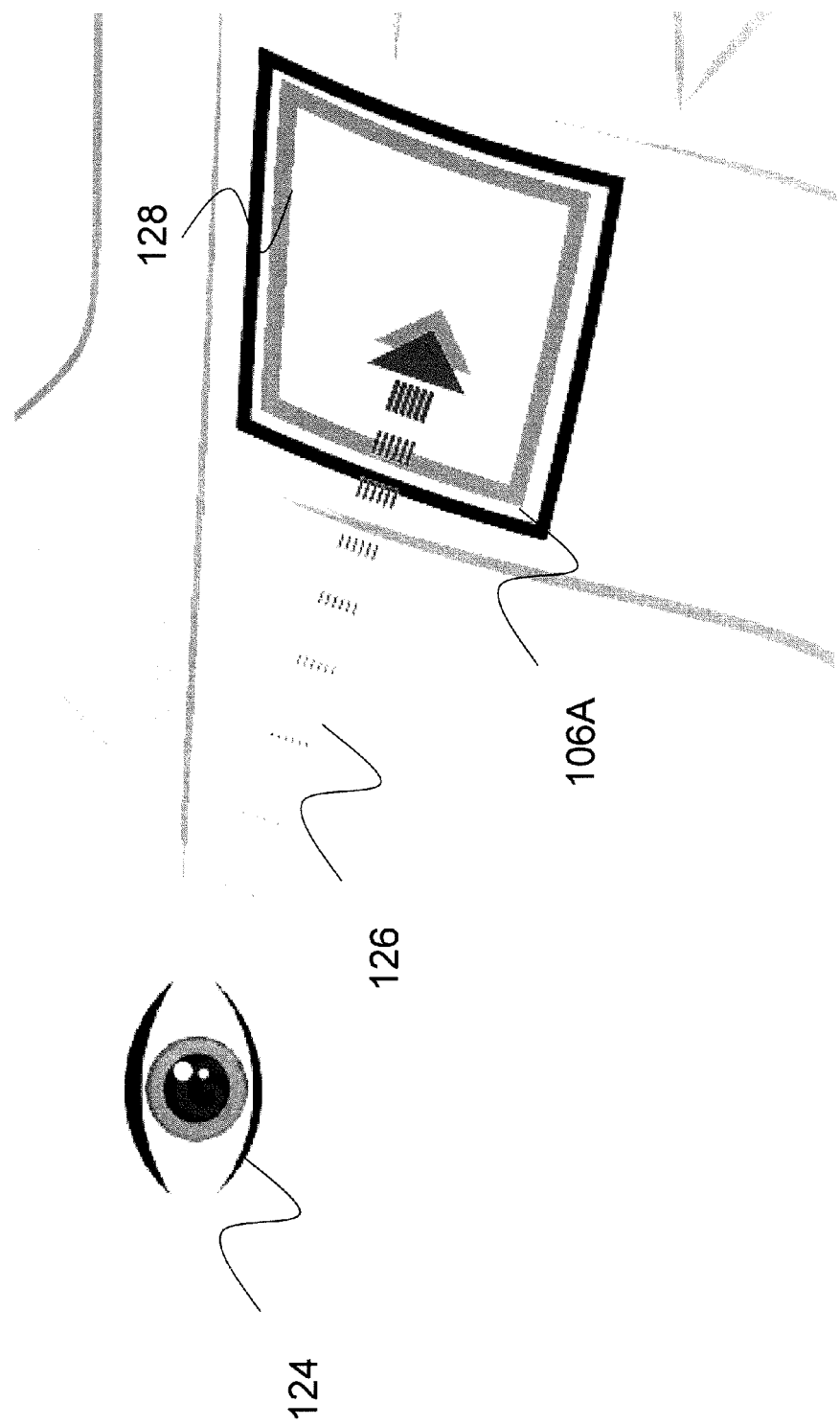
FIG. 5 is another illustrative embodiment indicating how a user's interaction with at least one user interface is analyzed using gaze tracking technology utilized by the control system of the disclosed embodiments.

As shown in FIG. 4, optionally, the display(s) used in any one of the user interfaces may be configured to changes in some visual property to indicate feedback to the user that this is the registered area of interest. Thus, for example, with regard to interface 106C, the interface may include constituent displays 122A, 122B, 122C. However, when it is determined that a user's eye(s) 124 is directed such that his gaze direction 126 is directed to display 122B, that display may be altered in some way (e.g., increased brightness, change in color, etc.) to indicate that it is the currently registered area of interest 128. Similarly, as illustrated in FIG. 5, a user's gaze directed at the interface 106A may trigger the corresponding display to be altered to illustrate that interface as the selected area of interest 128.

Figure 6:
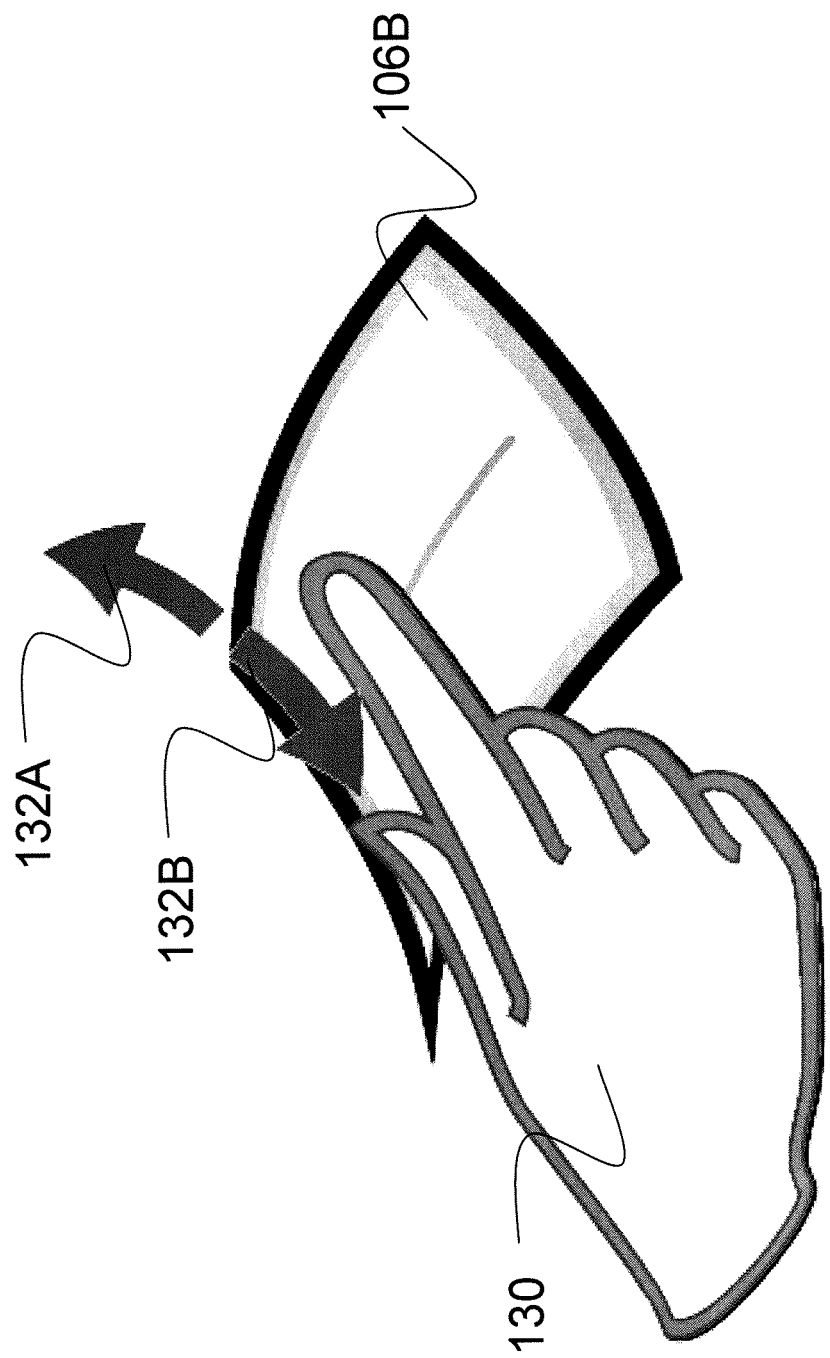
FIG. 6 is an illustrative embodiment indicating how a user's interaction with at least one user interface is analyzed using gesture recognition technology utilized by the control system of the disclosed embodiments.
Figure 7:
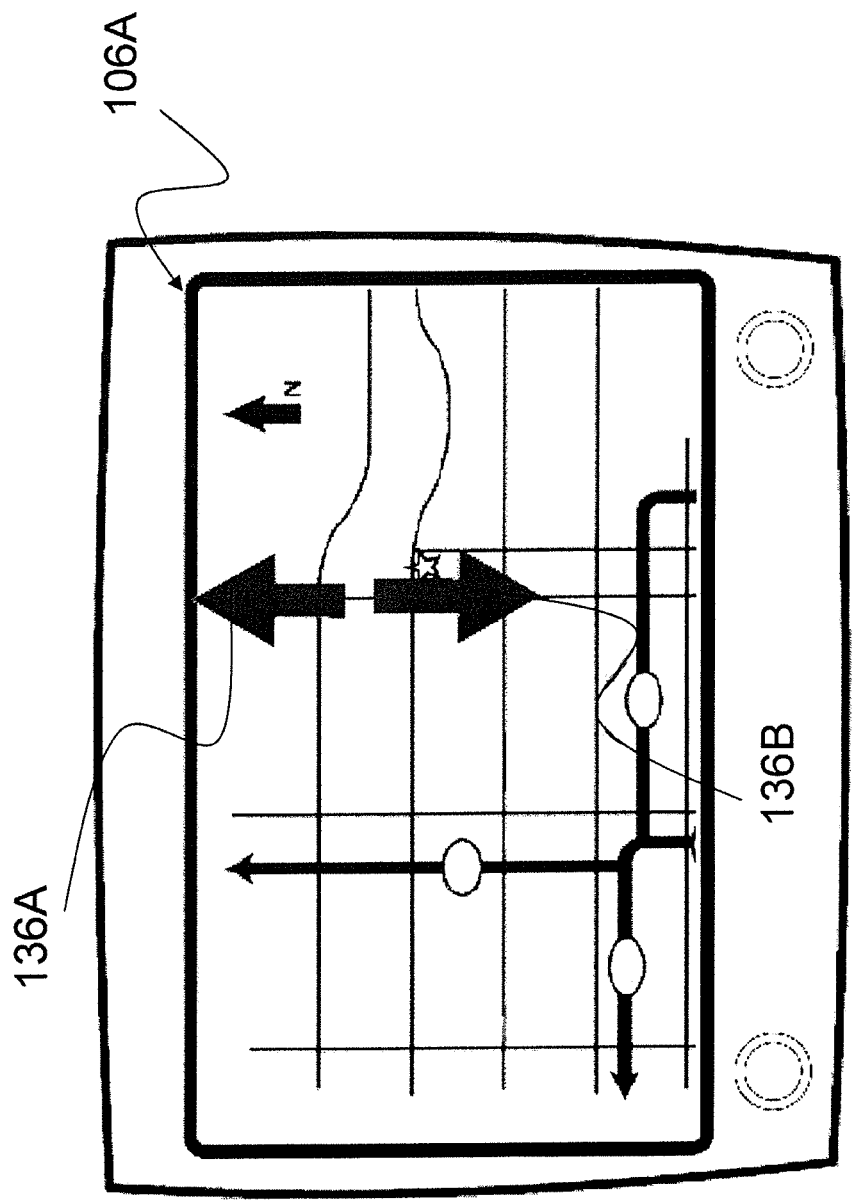
FIG. 7 is an illustrative embodiment indicating how recognized gestures are used by gesture recognition technology so as to be mapped to subject matter and to control that subject matter's display on a user interface included in or utilized by the control system of the disclosed embodiments.

Following, the system registering the user's area of interest based on the monitored user gaze direction, the system is able to monitor for a user's gesture to determine what control inputs the user is entering. For example, as shown in FIG. 6, the user may perform an up/down swipe movement 132A, 132B with his hand 130 on the touch surface 106B. Alternatively, with reference to FIG. 1, that gesture may be performed elsewhere, e.g., on the user's own leg, on a surface in the vehicle, in the air, etc. As a result of the gesture recognition technology recognizing the gesture, the graphics that comprise the map displayed on the interface of the user interface 106A may be controlled to move in an up/down direction 132A, 132B. Thus, as should in FIG. 7, the effect of such movement would move the displayed map in an up/down direction 136A, 136B on display 106A.

Figure 8:
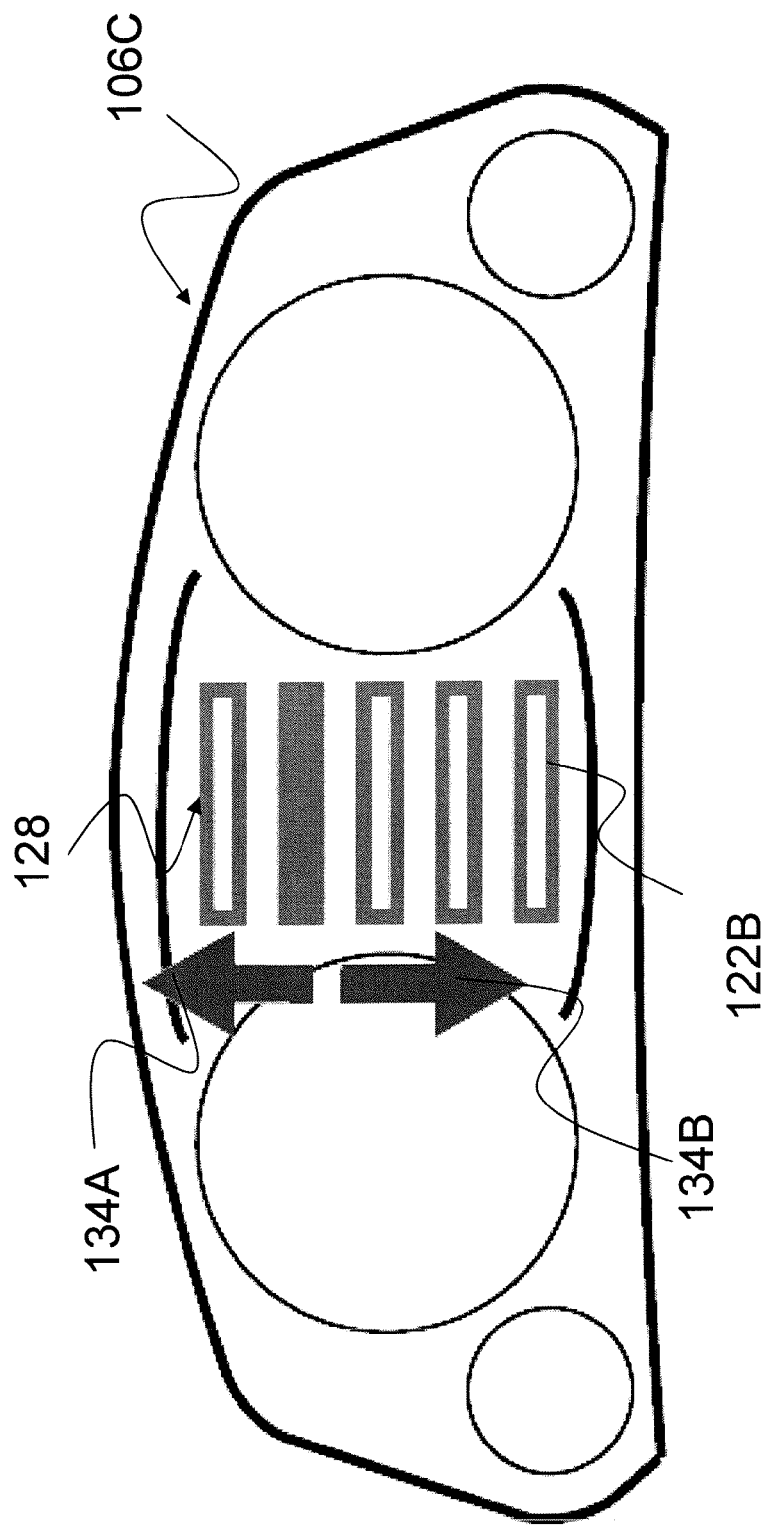
FIG. 8 is another illustrative embodiment indicating how recognized gestures are used by gesture recognition technology so as to be mapped to subject matter and to control that subject matter's display on a user interface included in or utilized by the control system of the disclosed embodiments.

To better understand the differing affect of such a movement, FIG. 8 illustrates another example, wherein that same up/down movement would have the effect of scrolling up 134A or down 134B through a listing of entries on the interface display 122B when it is selected as an active area of interest. Thus, it should be understood that the gaze direction technology utilized by the control system enables the ability to map the same or similar gestures to multiple control inputs because the gaze direction serves as a context signifier for the control system.

Figure 9:
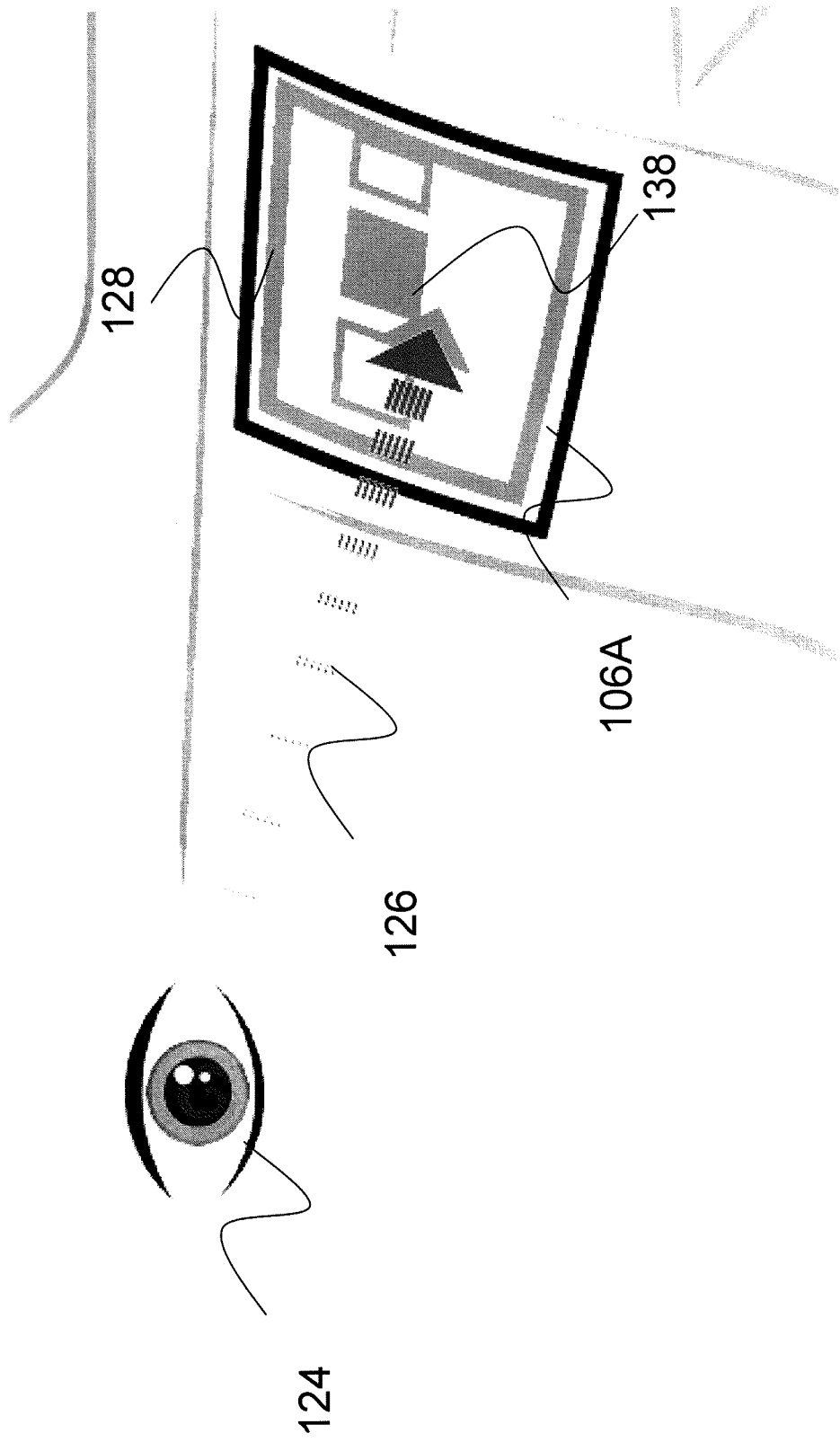
FIG. 9 is another illustrative embodiment indicating how recognized gestures are used by gesture recognition technology so as to be mapped to subject matter and to control that subject matter's display on a user interface included in or utilized by the control system of the disclosed embodiments.

As another example, and referring to FIG. 9, suppose the user 124 looks at the instrument cluster display 106A with the intent to change the radio station shown on a station list displayed on the infotainment system display (e.g., 106A). Again, the display may change some visual property to indicate to the user that this is the area of interest 128. Subsequently, the user may perform the same up/down swipe movement on the touch surface 106B (as illustrated in FIG. 6 or relative to an initial position on a vehicle surface, the user's body, in free space, etc.); however, because the user has indicated a different area of interest, the context of the movement signifies a different input control. Thus, for example, the graphics illustrated in the area of interest 128 that comprise the station list may be controlled to change in sequential order as a function of where the finger is on the touch surface 106B (or relative to an initial position on a vehicle surface, the user's body, in free space, etc.).

As explained above, and in this example as well, feedback for the user as to the affect of his monitored gestures enables the user to be cued by the changing graphics on the station list that a desired station is now an area of interest; as a result, the user may select the desired station by a simple gesture, e.g., a simple tap of his/her finger on a touch screen, his leg or elsewhere to select the station.

In at least one disclosed embodiment, explained with reference to FIG. 10, a user may look at a constituent display 122B of an instrument cluster display interface 106C to select that display as an active area of interest 128 with the intent to change from one menu to a next menu on a tab-based menu. As with other embodiments, the display interface 122B may changes some visual property to indicate to the user that this is the area of interest.

Figure 11:
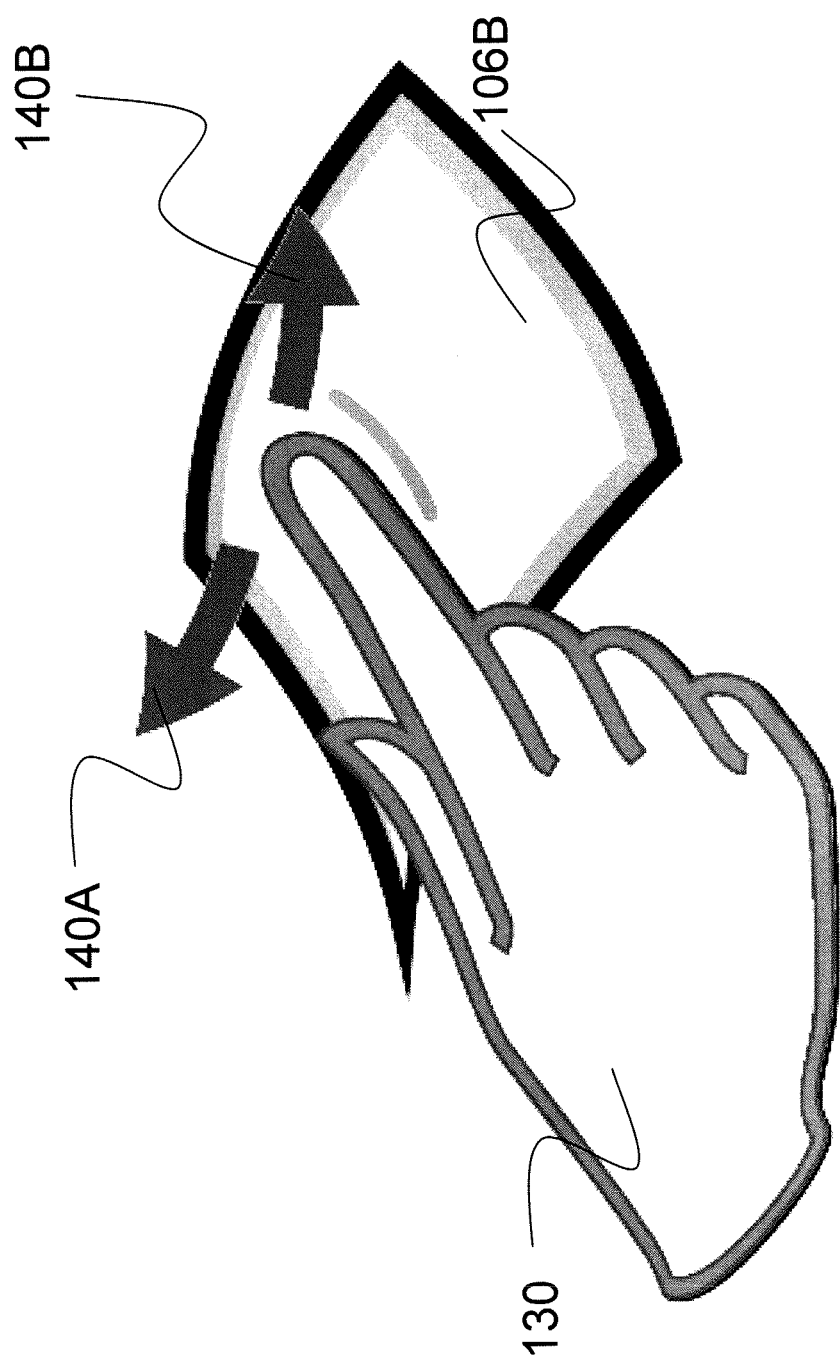
FIG. 11 is an illustrative embodiment indicating how a user's interaction with at least one user interface is analyzed using gesture recognition technology utilized by the control system of the disclosed embodiments.

Simultaneously or subsequently (e.g., within a specified period of time), the system monitors and detects a user gesture wherein the user performs a left/right swipe movement on the touch surface 106B (as illustrated in FIG. 11 as directions 140A, 140B or relative to an initial position on a vehicle surface, the user's body, in free space, etc.).

Figure 10:
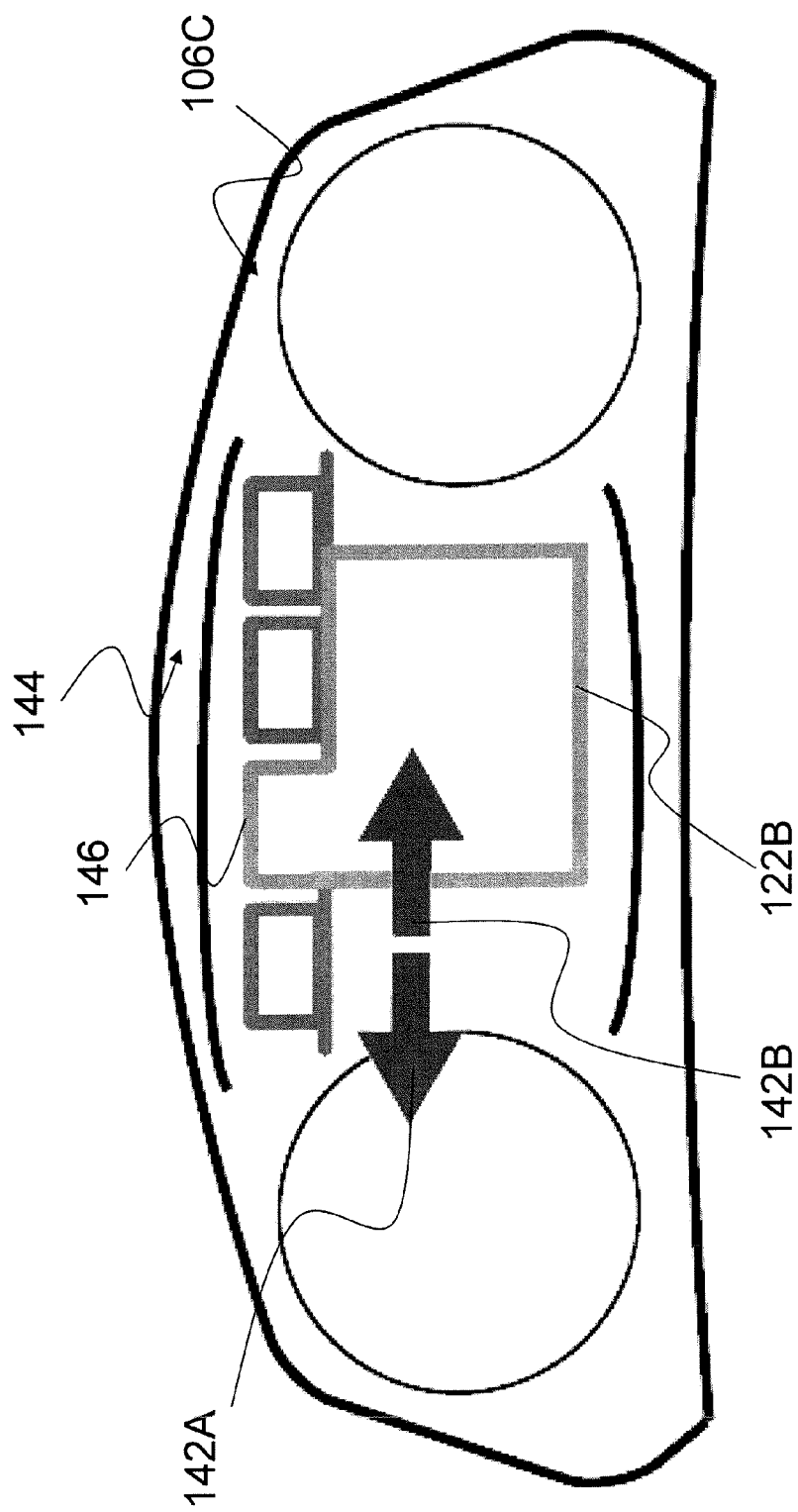
FIG. 10 is another illustrative embodiment indicating how recognized gestures are used by gesture recognition technology so as to be mapped to subject matter and to control that subject matter's display on a user interface included in or utilized by the control system of the disclosed embodiments.

As a result, the graphics that comprise the tab-based menu (as shown in FIG. 10) change in sequential order as a function of where the finger is on the touch surface 106B (or relative to an initial position on a vehicle surface, the user's body, in free space, etc.). When the user is cued by the changing graphics on the tab-based menu that the desired menu is now the selected area of interest, the user can now simply tap his/her finger to select the selected active tab.

Figure 12:
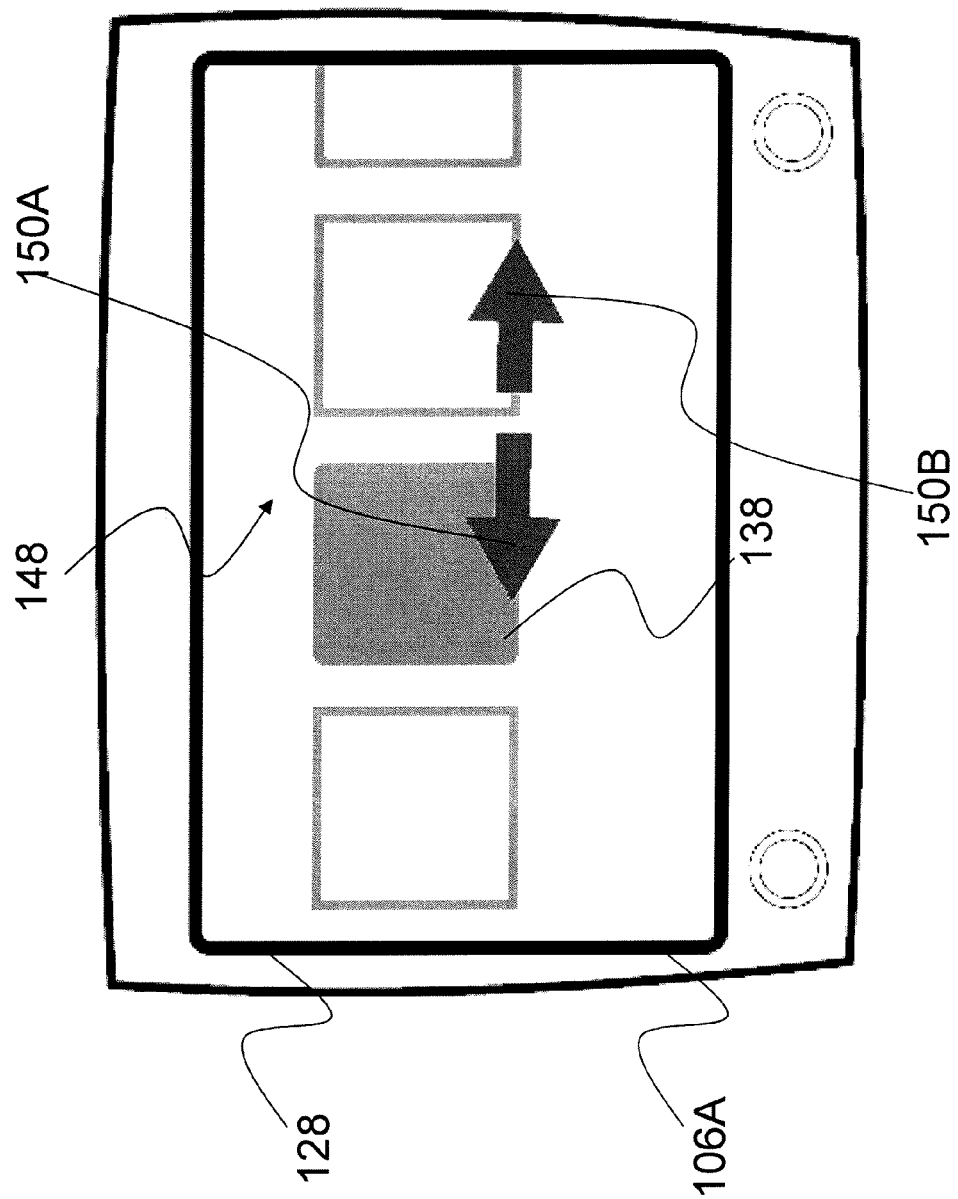
FIG. 12 is an illustrative embodiment indicating how recognized gestures are used by gesture recognition technology so as to be mapped to subject matter and to control that subject matter's display on a user interface included in or utilized by the control system of the disclosed embodiments.

Again, it should be understood that the gaze direction technology utilized by the control system enables the ability to map the same or similar gestures to multiple control inputs because the gaze direction serves as a context signifier for the control system. Thus, as illustrated in FIG. 12, if the user looked at the infotainment display (e.g., 106A) with the intent to change selection of an album via a "cover flow" menu structure 148 shown on the display 106A the effect of such a right/left sweep would be different. For example, the graphics that comprise the "cover flow" menu structure 148 would change in sequential order in a left/right direction 150A, 150B as a function of where the user's finger is on the touch surface 106B (or relative to an initial position on a vehicle surface, the user's body, in free space, etc.).

Thus, when the user is cued by the changing graphics on the "cover flow" menu structure 148 that the desired album is registered as the area of interest, the user can simply select the album for output by simply tapping his.

Figure 13:
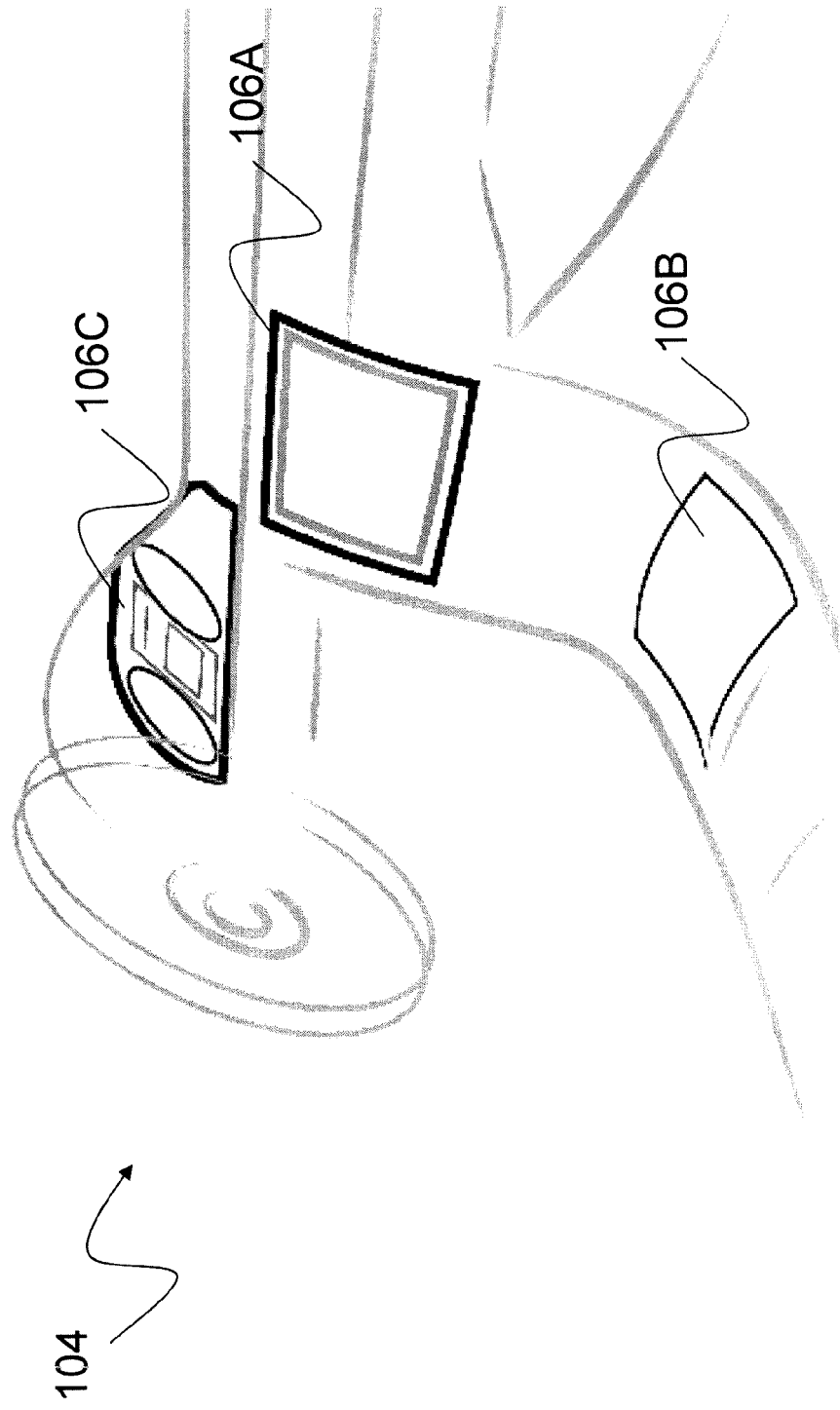
FIG. 13 illustrates examples of various user interfaces that may be incorporated in and/or utilized by the control system of the disclosed embodiments.
Figure 14:
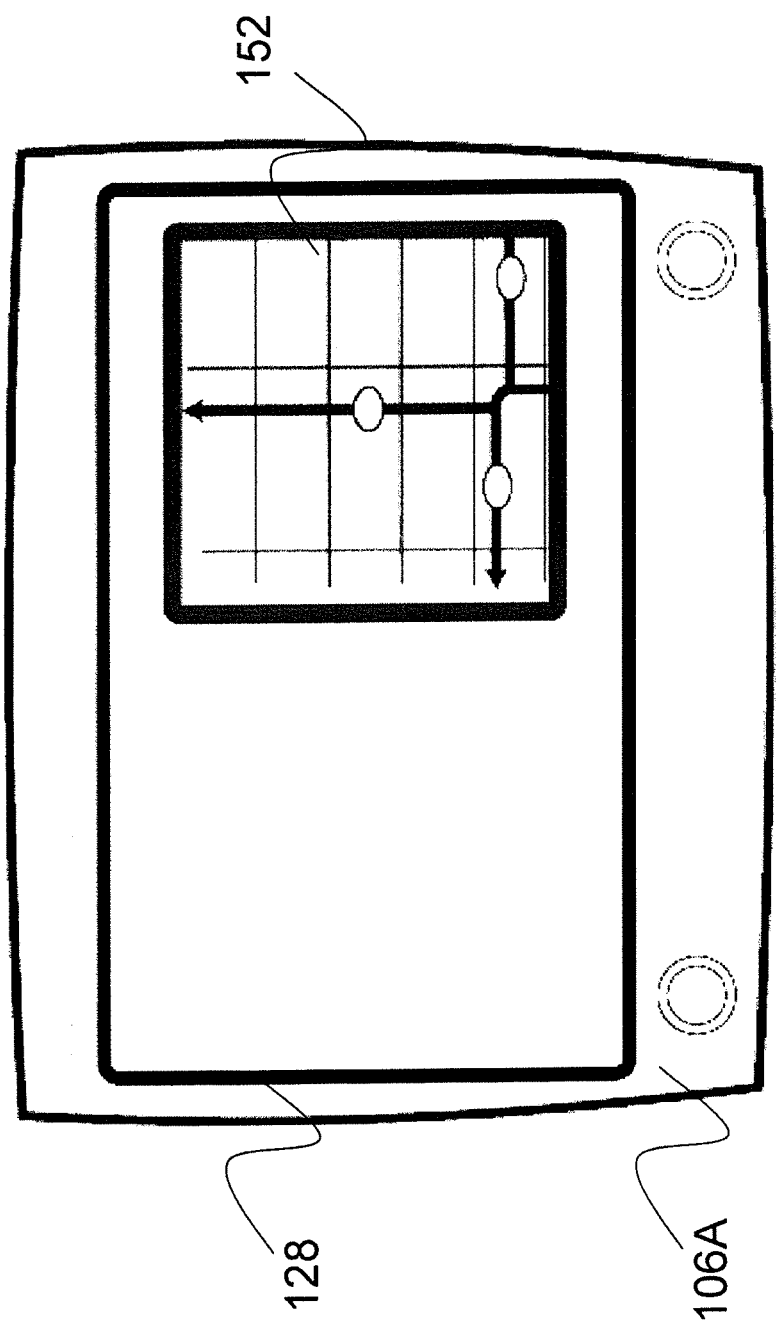
FIG. 14 is an illustrative embodiment indicating how a user's interaction with at least one user interface is analyzed using gaze tracking technology utilized by the control system of the disclosed embodiments.

FIG. 13 shows an additional implementation, wherein, for example, one of the user interfaces 106A provides an infotainment display, wherein, as shown in FIG. 14, once a user begins looking at the infotainment display, it is indicated via some visual property as being a selected area of interest 152. As shown in FIG. 14, two graphical applications are displayed within the area of interest 128 including a navigation map on the right and a web page on the left.

Subsequently, gaze direction may be used again to further designate a smaller or more specific area of interest within the selected area of interest. Thus, when the user begins looking at the navigation map with the intent to zoom in/out on the map, the displayed graphics comprising the map changes some visual property to indicate to the user that this is the selected area of interest 152.

With such a specified area of interest selected, the system may receive various gestures in connection with the touch surface of the user interface 106A (or optionally, as explained above, this gesture could be recognized on another surface or in free space). Thus, a user's input "pinch" gesture could be recognized by the system as an input command to scale the displayed map and the system could control the map to be scaled as a function of the "pinch" gesture magnitude.

Figure 15:
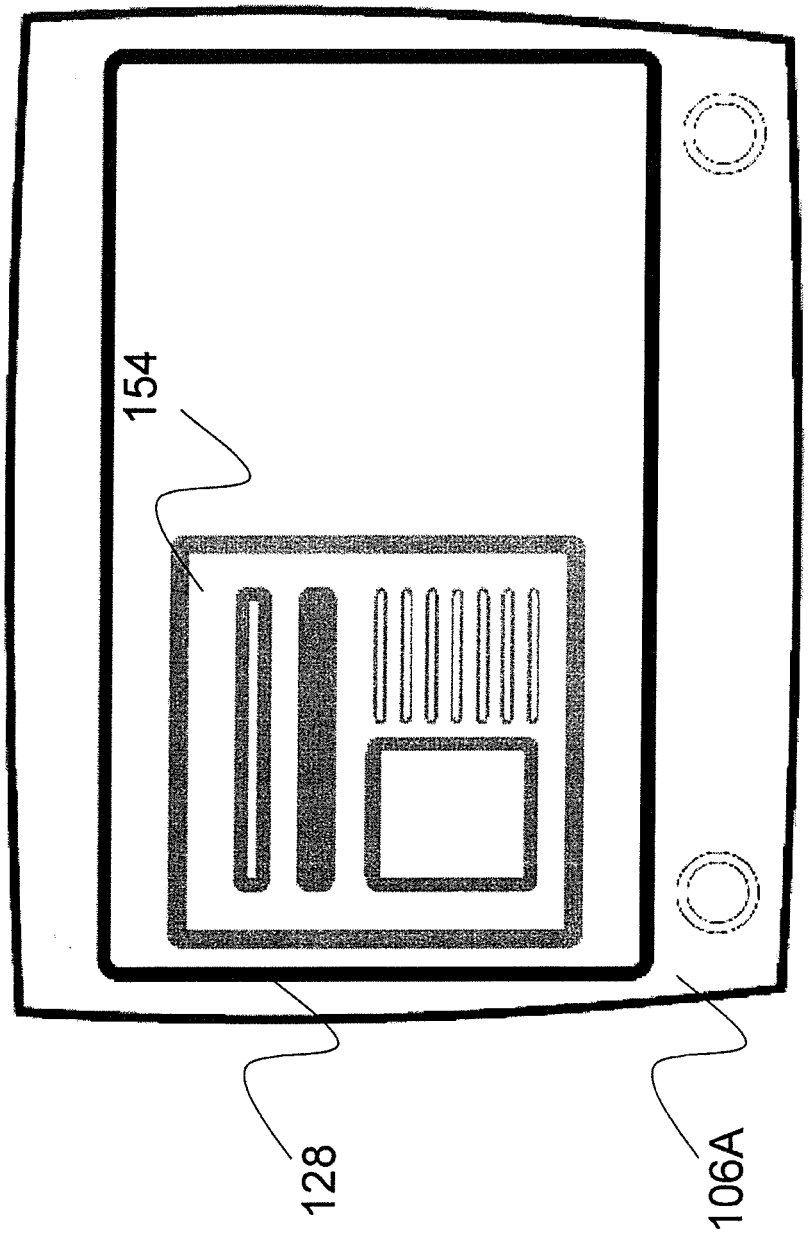
FIG. 15 is another illustrative embodiment indicating how a user's interaction with at least one user interface is analyzed using gaze tracking technology utilized by the control system of the disclosed embodiments.

Subsequently, gaze direction tracking used to recognize that the user is now looking at the web page application on the left side of the display with the intent to zoom in/out the content displayed would trigger a change in the selected active area of interest and the graphics comprising the web page could be changed to show some visual property to indicate to the user that this is the more specific selected area of interest 154 within the selected area of interest 154, as shown in FIG. 15.

Thus, when such a specified area of interest is selected, the system may similarly receive various gestures in connection with the touch surface of the user interface 106A (or optionally, as explained above, this gesture could be recognized on another surface or in free space). Thus, a user's input "pinch" gesture could be recognized by the system as an input command to scale the displayed web page and the system could control the display of the web page to be scaled as a function of the "pinch" gesture magnitude.

Figure 16:
FIG. 16 is an illustrative embodiment indicating how recognized gestures are used by gesture recognition technology so as to be mapped to subject matter and to control that subject matter's display on a user interface included in or utilized by the control system of the disclosed embodiments.

FIG. 16 illustrates an example of system operation wherein a user is provided with the ability to input control commands using the touch screen of the user interface 106B. As shown in FIG. 16, the mode of operation may enable the user to interact with an infotainment display (e.g., 106A shown in other figures of the application) using the touch surface 106B. Accordingly, a user may use their hand 130 to interact with the touch surface of the user interface 106B to move in directions 156A or 156B (thereby signifying X- and Y-axis movements and also diagonal movements there between) to interact with the displayed content on user interface 106A.

Figure 17:
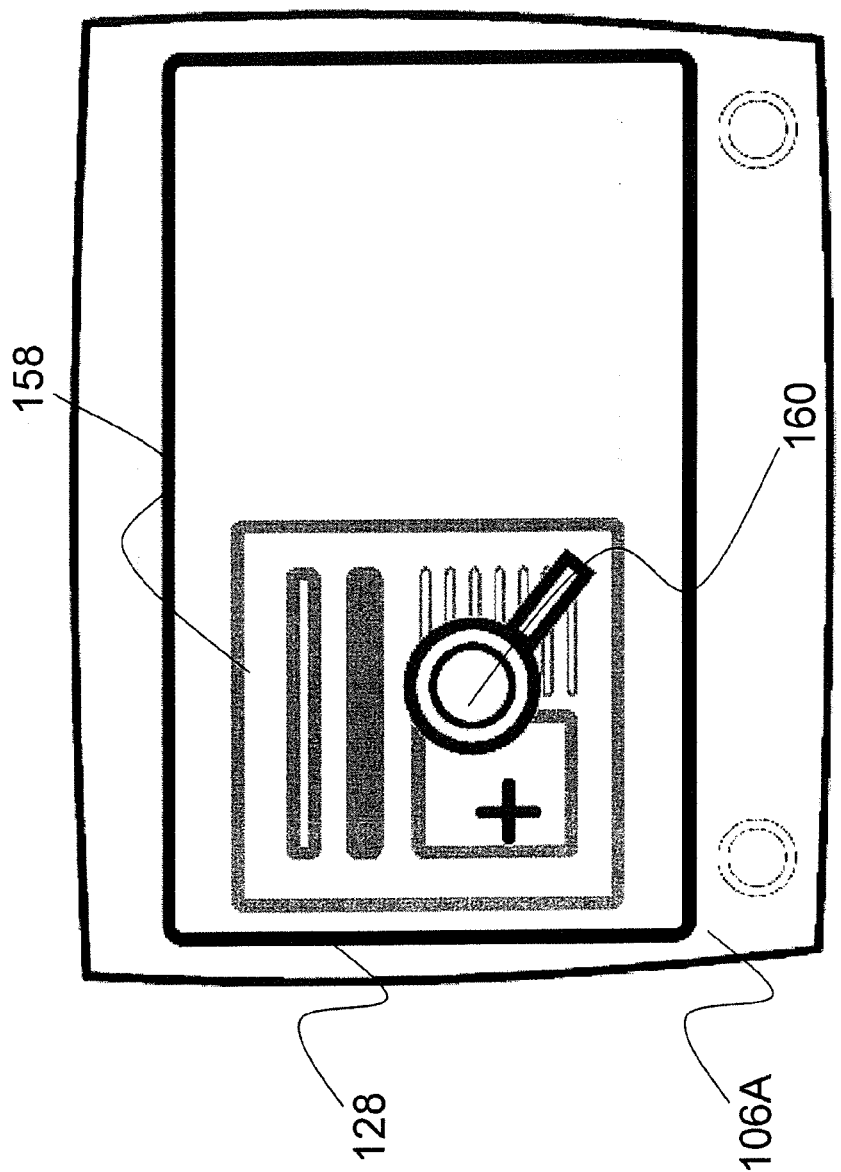
FIG. 17 is another illustrative embodiment indicating how a user's interaction with at least one user interface is analyzed using gaze tracking technology and gesture recognition technology utilized by the control system of the disclosed embodiments.
Figure 18:
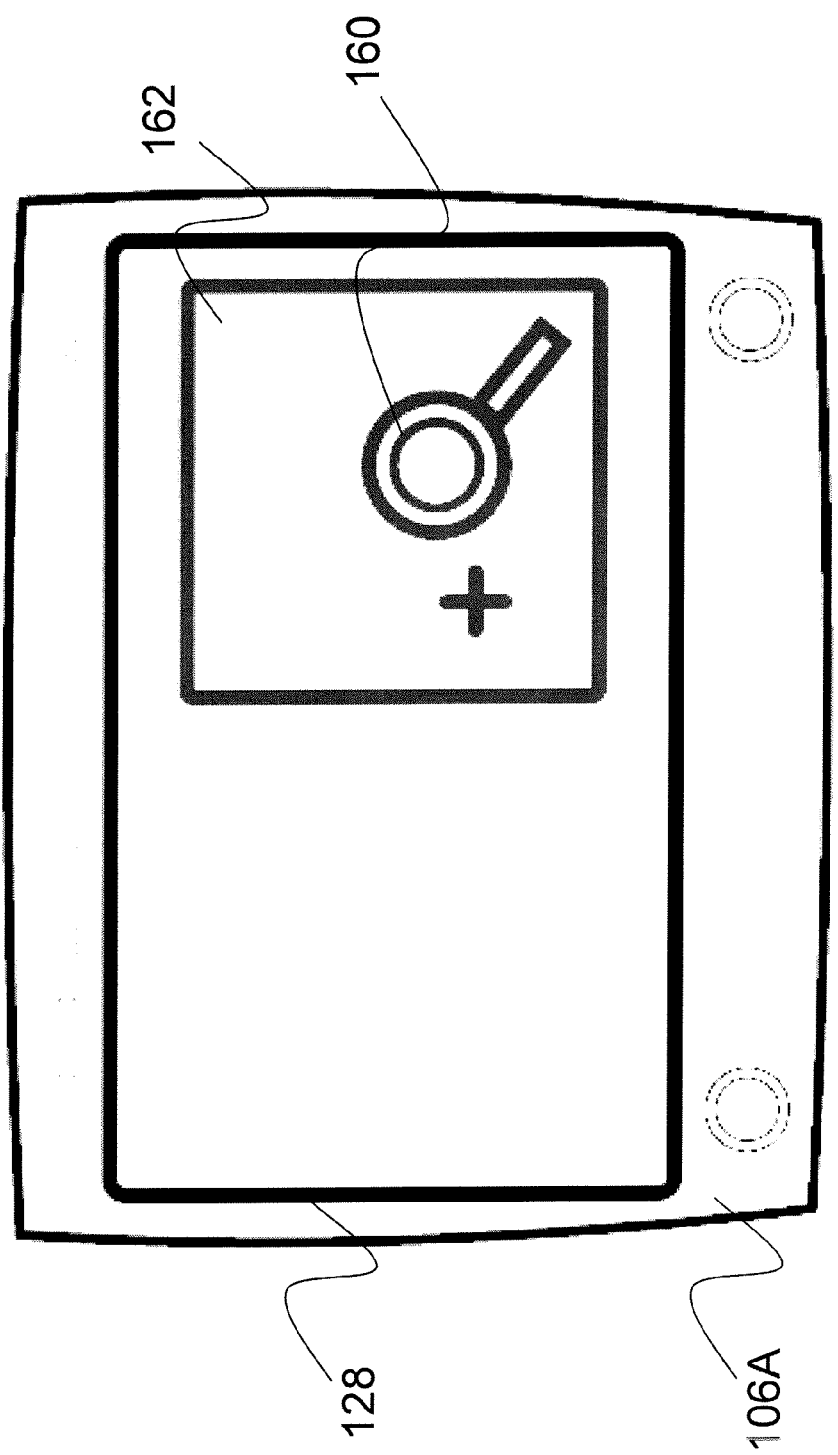
FIG. 18 is another illustrative embodiment indicating how a user's interaction with at least one user interface is analyzed using gaze tracking technology and gesture recognition technology utilized by the control system of the disclosed embodiments.

As a result, as illustrated in FIG. 17, the infotainment display included in user interface 106A may display, for example, a web page comprised of a data entry field (e.g., Google® search field), search button, and a list of returned search hits (e.g., options). As explained above, gaze direction tracking by the system enables the system to determine that the user is looking at a data entry field, thereby signifying the intent to enter a search term, e.g., "Olympics. As explained above, with reference to FIGS. 14-15, the gaze direction tracking technology enables the system to identify very specific graphics displayed on a user interface and also to change some visual property of the graphics to indicate to the user that this is the area of interest.

Subsequently, gesture monitoring, as explained above, enables the system to recognize that the user is performing character (i.e., alpha-numeric, graphical symbols, etc.) input movements on the touch surface illustrated in FIG. 16. As a result of monitoring the gestures, the system is able to determine the graphics that comprise characters and display the recognized characters in the data entry field included in the active area of interest 158. In this example, the system may track the user's gaze and recognize that the user has looked at the search button displayed in the area of interest 158 to signify the intent to execute a search based on the input characters. As above, it should be understood that the graphics that comprise the search button may be changed in some visual property to indicate to the user that this is the area of interest.

Subsequently, the gesture recognition technology may be used to determine that the user has performed a simple gesture, e.g., tapping his finger on the touch surface 106B in order to execute the search. The system may then trigger display of search results from the user input search on the infotainment display 106A. If a user then looks at the list of returned search hits and wishes to signify his intent to scroll through the list of returned search items, the user can input commands (explained above) to trigger scrolling, e.g., moving his fingers up/down with reference to a point in space, on a surface or on a touch surface of a user interface. As a result of recognizing the gesture, the system may alter the graphics that comprise the list of returned search items in some visual property to indicate to the user that this is the area of interest.

Thus, the system enables the user to perform an up/down swipe movement on the touch surface or elsewhere with his finger to enable changes to the display of the sequentially ordered items in the returned list. Alternatively, other gestures may be detected with different mapped control operations, e.g., a user performing an up/down swipe movement on the touch surface with two fingers may trigger display of a next page of the returned list of search items on the display.

Finally, it should be noted that disclosed embodiments enable the ability to recognize user gestures, whether they be input relative to a touch surface, on a surface of the vehicle cabin, or the user's own body. Thus, up/down swipe, left/right swipe, pinch, character input, and button press gestures may all be recognized when they are performed on any surface within reach of the user, including their own body (e.g., while resting the hand on the knee). Additionally, the gestures may be performed in space, requiring no surface on which to perform the gestures.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, the system may utilize various different types of user interfaces including one or more head-up displays or heads-up display (HUDs), which may include any transparent display that presents data without requiring users to look away from their usual viewpoints. Such a HUD may contain a projector unit, a combiner, and video generation software (which may be implemented in the vehicle software and, more specifically be incorporated in or interact/cooperate with the software running on the processor(s) for implementing the disclosed control system embodiments. Accordingly, the software may provide an interface between the HUD (i.e. the projection unit) and the systems/data to be displayed and generates the imagery and symbology to be displayed by the projection unit.

Additionally, as is known, the HUD's projection unit may include an optical collimator setup with a convex lens or concave mirror with a Cathode Ray Tube, light emitting diode, or liquid crystal display at its focus. The combiner may be implemented using a conventionally known angled flat piece of glass (a beam splitter) located directly in front of the viewer, that redirects the projected image from projector in such a way as to see the field of view and the projected infinity image at the same time.

In the above description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

As a result, it will be apparent for those skilled in the art that the illustrative embodiments described are only examples and that various modifications can be made within the scope of the invention.

The invention claimed is:

1. A control system comprising:
   at least one user interface that outputs data to a user;
   at least one gaze tracking sensor that tracks a gaze of the user and outputs data indicating a gaze direction of the user;
   a processor that receives the data indicating the gaze direction of the user; and
   a plurality of gesture recognition sensors that configured to detect at least one gesture made by the user, on a plurality of disjunct surfaces included in an automotive vehicle in which the user is sitting and outputs data indicating the at least one gesture,
   wherein the processor includes a means for determining the functionality a user wishes to control by tracking the user's gaze using the data indicating the gaze direction of the user and identifying a selected area of interest displayed on the at least one user interface based on the data indicating the gaze direction of the user,
   wherein the processor also includes a means for recognizing at least one gesture based on the data indicating the at least one gesture made by the user and for controlling at least one operation associated with the selected area of interest based on the data indicating the at least one gesture made by the user, and
   wherein the control system controls operation of the vehicle or in-vehicle control system for the vehicle in which the user is sitting.

2. The control system of claim 1, wherein the at least one user interface includes a touch screen display that both outputs data to the user and receives data from the user.

3. The control system of claim 1, wherein the system further comprises a plurality of user interfaces including the at least one user interface that outputs data to the user, wherein at least one other user interface included in that plurality includes a touch surface that receives data from the user in the form of a gesture data and provides the at least one gesture recognition sensor.

4. The control system of claim 3, wherein data input to the touch surface is received from a user by received data indicating one or more positions on the touch surface where the user has drawn.

5. The control system of claim 1, wherein the system controls in-vehicle infotainment features and/or driver assistance systems within the automotive vehicle.

6. The control system of claim 1, wherein the means for determining and identifying the selected area of interest alters display of the selected area of interest on the at least one user interface once the selected area of interest is identified.

7. The control system of claim 1, wherein the means for recognizing at least one gesture and the at least one gesture recognition sensor cooperate to recognize the user's at least one gesture made in free space.

8. The control system of claim 1, wherein the means for recognizing at least one gesture and the at least one gesture recognition sensor cooperate to recognize the user's at least one gesture made on a surface within arm's reach of the user.

9. The control system of claim 1, wherein the at least one gesture recognition sensor is a camera-based hand and finger gesture tracking sensor and/or tactile control surface sensor.

10. The control system of claim 1, wherein the at least one gaze tracking sensor is a camera-based eye tracking sensor.

11. A method for receiving at least one control command from a user using a control system, the method comprising:
   tracking a gaze of the user using at least one gaze tracking sensor and outputting data indicating a gaze direction of the user;
   receiving, at a processor, the data indicating the gaze direction of the user; detecting via a plurality of gesture recognition sensors at least one gesture performed by the user on a plurality of disjunct surfaces included in an automotive vehicle in which the user is sitting using at least one gesture recognition sensor and outputting data indicating the at least one gesture to the processor;
   determining functionality a user wishes to control by tracking the user's gaze using the data indicating the gaze direction of the user and identifying a selected area of interest displayed on at least one user interface based on the data indicating the gaze direction of the user, and
   recognizing at least one gesture based on the data indicating the at least one gesture made by the user; and
   controlling at least one operation associated with the selected area of interest based on the data indicating the at least one gesture made by the user
   wherein the at least one operation controlled by the method is an operation of the vehicle or in-vehicle control system for the vehicle in which the user is sitting.

12. The method of claim 11, further comprising outputting data to the user via the at least one user interface prior to tracking the gaze direction of the user.

13. The method of claim 12, wherein a plurality of user interfaces are utilized that include the at least one user interface that outputs data to the user, wherein at least one other user interface included in that plurality includes a touch surface that receives data from the user in the form of a gesture data and provides the at least one gesture recognition sensor.

14. The method of claim 13, wherein data input to the touch surface is received from a user by received data indicating one or more positions on the touch surface where the user has drawn.

15. The method of claim 11, wherein the at least one user interface includes a touch screen display that both outputs data to the user and receives data from the user.

16. The method of claim 11, wherein the at least one operation controls in-vehicle infotainment features and/or driver assistance systems within the automotive vehicle.

17. The method of claim 11, further comprising altering display of the selected area of interest on the at least one user interface once the selected area of interest is identified.

18. The method of claim 11, wherein the recognizing of the at least one gesture is performed using at least one gesture recognition sensor that recognizes the user's at least one gesture made in free space.

19. The method of claim 11, wherein the recognizing of the at least one gesture is performed using at least one gesture recognition sensor that recognizes the user's at least one gesture made on a surface within arm's reach of the user.

20. The method of claim 11, wherein the at least one gesture recognition sensor is a camera-based hand and finger gesture tracking sensor and/or tactile control surface sensor.

21. The method of claim 11, wherein the at least one gaze tracking sensor is a camera-based eye tracking sensor.

22. A transportation system comprising:
   at least one user interface that outputs data to a user;
   at least one gaze tracking sensor that tracks a gaze of the user and outputs data indicating a gaze direction of the user;
   a passenger vehicle including the at least one user interface,
   a processor that receives the data indicating the gaze direction of the user; and
   a plurality of camera-based gesture recognition sensors configured to detect at least one gesture made by the user on a plurality of disjunct surfaces included in an automotive vehicle in which the user is sitting and outputs data indicating the at least one gesture,
   wherein the processor includes a means for determining the functionality a user wishes to control by tracking the user's gaze using the data indicating the gaze direction of the user and identifying a selected area of interest displayed on the at least one user interface based on the data indicating the gaze direction of the user, and
   wherein the processor includes software that recognizes at least one gesture based on the data indicating the at least one gesture made by the user and controls at least one operation associated with the selected area of interest based on the data indicating the at least one gesture made by the user,
   wherein the at least one operation is an operation of the vehicle or in-vehicle control system for the vehicle in which the user is sitting.

23. The control system of claim 1, wherein the at least one user interface includes at least two displays at two locations in the vehicle.

24. The method of claim 11, wherein the at least one user interface includes at least two displays at two locations in the vehicle.

25. The control system of claim 24, wherein the at least one gesture controls a first functionality when the gaze data indicates a gaze direction of a user to the first display and the at least one gesture controls a second functionality when the gaze data indicates a gaze direction of a user to the second display.

26. The method of claim 23, wherein the at least one gesture controls a first functionality when the gaze data indicates a gaze direction of a user to the first display and the at least one gesture controls a second functionality when the gaze data indicates a gaze direction of a user to the second display.

* * * * *